Patented June 29, 1943

2,323,061

UNITED STATES PATENT OFFICE 2,323,061

ISOLATION OF DICARBOXYLIC ACIDS FROM THEIR MIXTURES

Wolfgang Lehmann, Cologne-Mulheim, and Rudolf Schröter, Leverkusen-Schlebusch, Germany; vested in the Alien Property Custodian No Drawing. Application August 3, 1940, Serial No. 351,158. In Germany July 20, 1939

3 Claims. (Cl. 260—537)

The present invention relates to a process for isolating the individual ω.ω'-dicarboxylic acids from mixtures thereof.

Aliphatic ω.ω'-dicarboxylic acids are employed on a large scale for the preparation of artificial masses, for instance, by causing the same to react with polyvalent hydroxy compounds or with diamines. It is, therefore, a problem to develop an easy and economical method for preparing such dicarboxylic acids on a technical scale. The present invention is primarily concerned with those aliphatic ω.ω'-dicarboxylic acids having a chain of at least 7 carbon atoms which are directly connected with each other. Mixtures of 2 such dicarboxylic acids can be prepared, for instance, by subjecting 12-hydroxy stearic acid to a splitting up reaction under oxidizing conditions. In this case, the resultant mixture consists of about equimolecular amounts of the undecan-dicarboxylic acid of the composition $C_{11}H_{20}O_4$ and of the dodecan-dicarboxylic acid of the composition $C_{12}H_{22}O_4$. The 12-hydroxy stearic acid can be prepared by reducing the ricinoleic acid or derivatives thereof by means of hydrogen in the presence of catalysts. The splitting up of the 12-hydroxy stearic acid can be effected, for instance, by means of nitric acid or chromic acid or by means of an alkali metal permanganate or finally by melting the acid with caustic soda. The resulting reaction mixture consists for about 80% of a mixture of equimolecular amounts of the said dicarboxylic acids, a minor amount of monocarboxylic acids which are contained therein as impurities being removed by steam distillation. As a matter of fact, our present invention is not restricted to the separation of the said mixtures, since it can be applied quite generally to other mixtures of dicarboxylic acids of the character described wherein the individual members are present in nearly equimolecular amounts.

We have found that dicarboxylic acids of the character described can be isolated from such mixtures in a very pure state and a very good yield by the application of the following steps: To an aqueous solution of water-soluble neutral salts of a mixture of the character described there is added such an amount of a mineral acid or of an acid salt of a mineral acid as is sufficient to set free one half of the carboxylic acid groups contained in the mixture; the precipitated dicarboxylic acid is removed; there is added to the mother liquor such an additional amount of a mineral acid or an acid reacting salt of a mineral acid as is sufficient to set free the remaining carboxylic acid groups and, thereupon, the precipitated acid is removed. It has been found that as a rule the acid having the higher molecular weight is precipitated nearly quantitatively before any traces of the acid having the lower molecular weight are separated. This effect certainly could not be foretold as higher members of aliphatic dicarboxylic acids show a pronounced community of chemical and physical properties. This method allows one to isolate the members from such mixtures in a much simpler manner and in a better yield than could be effected according to the hitherto employed methods, for instance, by subjecting the mixture to a fractional distillation in the form of its esters. The content of carboxylic acid groups of the mixtures serving as starting materials can be determined, for instance, by titrating.

The invention is furthermore illustrated by the following examples, without being restricted thereto:

Example 1

80 parts by weight of a mixture of equal parts of azelaic acid and sebacic acid are dissolved in 822 parts by volume of 1 n-caustic soda lye. The solution is heated to 90–100° C., whereupon there are added thereto 410 parts by volume of 1 n-hydrogen chloride solution. After cooling to 2–3° C. the precipitated sebacic acid is filtered off, washed three times with cold water and dried. There are obtained 35 parts by weight of a sebacic acid of the melting point 130–131° C., the melting point of the pure product being 133° C. 1 gram of the resulting product requires for neutralization 9.85 ccms. of a 1 n-caustic soda lye, 9.9 ccms. being required by the pure product. It is evident therefrom that the sebacic acid is obtained in a relatively pure state. The filtrate obtained upon the removal of the sebacic acid is mixed with 420 parts by volume of a 1 n-hydrogen chloride solution and cooled by means of ice, the azelaic acid crystallizing out in the form of needles. It is obtained in a yield of about 38 parts by weight, the melting point being 102–103° C. 1 gram thereof requires for neutralization 10.55 ccms. of a 1 n-caustic soda lye, the pure product requiring 10.63 ccms.

Example 2

50 parts by weight of a mixture of equal parts of suberic acid and undecan-dicarboxylic acid of the composition $C_{11}H_{20}O_4$ are dissolved in 519 parts by volume of 1 n-caustic soda lye at 90° C.

Thereupon there are added thereto 249 parts by volume of 1 n-sulfuric acid. The whole is cooled down to 2–4° C. and the precipitated undecan-dicarboxylic acid is filtered off. There are obtained 22 parts by weight of a product of the melting point 105–106° C. 1 gram of the resulting product requires for neutralization 9.22 ccms. of a 1 n-caustic soda lye, 9.26 ccms. being required by a product. To the filtrate obtained there are added further 272 parts by volume of 1 n-sulfuric acid; upon cooling the suberic acid is precipitated in form of crystals. 1 gram of the resulting product requires for neutralization 11.35 ccms. of 1 n-caustic soda lye, 11.49 ccms. being required by the pure product.

*Example 3*

70 parts by weight of a mixture of equal parts of undecan-dicarboxylic acid of the composition $C_{11}H_{20}O_4$ and dodecan-dicarboxylic acid of the composition $C_{12}H_{22}O_4$ are dissolved in 627 parts by volume of 1 n-caustic soda lye. At 95° C. there are added thereto 325 parts by volume of 1 n-sulfuric acid, the whole being cooled down to 10° C. and the precipitated product being filtered off, washed with cold water and dried. There are obtained 32 parts by weight of dodecan-dicarboxylic acid of the melting point 123–123.5° C., the melting point of the pure product being 125° C.

The filtrate obtained upon the removal of the dodecan-dicarboxylic acid is mixed with 303 parts by volume of 1 n-sulfuric acid at 90–100° C. Upon cooling the undecan-dicarboxylic acid separates in white needles. It is filtered off and washed with cold water. There are obtained 31 parts by weight of a product of the melting point 102–102.5° C., the melting point of the pure product being 105° C.

*Example 4*

60 parts by weight of a mixture of equal parts of sebacic acid and dodecan-dicarboxylic acid are dissolved in 560 parts by volume of 4% caustic soda lye and treated as described in Example 3. After adding 272 parts by volume of a 3.65% hydrochloric acid there are obtained 28 parts by weight of a product of the melting point 122.5–123° C.

By adding to the filtrate further 288 parts by volume of a 3.65% hydrochloric acid 27 parts by weight of sebacic acid of the melting point 130–131° C. are precipitated.

We claim:

1. A process for isolating the individual acids from a mixture of about equimolecular quantities of 2 aliphatic dicarboxylic acids each having a chain of at least 7 carbon atoms directly connected with each other, which comprises adding to an aqueous solution of water-soluble neutral salts of such a mixture such an amount of an acid reacting substance selected from the group consisting of mineral acids and water-soluble acid salts thereof as is sufficient to set free one half of the carboxylic acid groups therein contained, removing the precipitated acid and then setting free the remaining carboxylic acid groups by the incorporation with the mother liquor of additional acid reacting substances.

2. The process as claimed in claim 1 wherein as water-soluble neutral salts the alkali metal salts are employed.

3. The process as claimed in claim 1 wherein a mixture of about equimolecular quantities of the undecan-dicarboxylic and the dodecan-dicarboxylic acid is employed.

WOLFGANG LEHMANN.
RUDOLF SCHRÖTER.